United States Patent
Wilson (10) Patent No.: US 6,945,423 B2
(45) Date of Patent: Sep. 20, 2005

(54) MEDIALLY STABILIZED LIQUID SURGE SUPPRESSORS

(76) Inventor: William F. Wilson, #9 Bear Ridge Rd., White Bird, ID (US) 83554

(*) Notice: Subject to any disclaimer, the term of this patent is extended or adjusted under 35 U.S.C. 154(b) by 142 days.

(21) Appl. No.: 10/418,797

(22) Filed: Apr. 17, 2003

(65) Prior Publication Data
US 2004/0155044 A1 Aug. 12, 2004

Related U.S. Application Data
(60) Provisional application No. 60/445,056, filed on Feb. 6, 2003.

(51) Int. Cl.[7] .............................................. B65D 88/12
(52) U.S. Cl. ....................................... 220/563; 137/574
(58) Field of Search ................................ 220/563, 4.14, 220/88; 137/574; 446/80, 488; 411/500, 338, 344, 347; 428/8, 9, 542.6; D11/141

(56) References Cited

U.S. PATENT DOCUMENTS

| 1,703,438 | A | * | 2/1929 | Bird et al. ...................... 428/8 |
| 4,746,022 | A | * | 5/1988 | Benham ...................... 211/195 |
| 4,902,182 | A | * | 2/1990 | Lewis ......................... 411/510 |
| 5,890,618 | A |   | 4/1999 | Spickelmire |
| 5,960,981 | A |   | 10/1999 | Dodson et al. |
| 6,062,417 | A |   | 5/2000 | Evans |
| 6,308,856 | B1 |   | 10/2001 | Spickelmire |
| 6,375,030 | B1 |   | 4/2002 | Spickelmire |
| D469,846 | S |   | 2/2003 | Spickelmire |
| 2001/0013366 | A1 |   | 8/2001 | Spickelmire et al. |
| 2002/0063133 | A1 |   | 5/2002 | Spickelmire et al. |
| 2004/0134916 | A1 | * | 7/2004 | Bambacigno ............... 220/563 |

FOREIGN PATENT DOCUMENTS

CA 2373898 9/2002

OTHER PUBLICATIONS

Surge Control Systems, "Surge Buster Your #1 Tie Down System for Liquid Cargo Load Surge," 2001, http://www.surgecontrolsystems.com, 7 pages, (downloaded Mar. 25, 2003).

* cited by examiner

Primary Examiner—Joseph C. Merek (57) ABSTRACT

The present disclosure provides liquid surge suppressors and methods of manufacturing such surge suppressors. In one exemplary implementation of the invention, a surge suppressor includes a plurality of flexible longitudinal members, each of which is joined to the other longitudinal members at a first junction and at a second junction spaced from the first junction along a central axis. A generally planar medial disk may lie in a transverse plane substantially perpendicular to the central axis and having a generally circular central orifice. The medial disk being joined to a portion of each of the longitudinal members intermediate the first and second junctions and defining a fixed relationship between the longitudinal members.

7 Claims, 8 Drawing Sheets

MEDIALLY STABILIZED LIQUID SURGE SUPPRESSORS

CROSS-REFERENCE TO RELATED APPLICATION(S)

This non-provisional application claims priority to Provisional U.S. Patent Application No. 60/445,056, entitled LIQUID TIE-DOWN SYSTEM, filed 6 Feb. 2003, hereby incorporated in its entirety by reference thereto.

TECHNICAL FIELD

The present invention generally relates to baffles or the like located within liquid-filled tanks to control surging. More particularly, several aspects of the present invention are related to medially stabilized surge suppressors and methods for using the members.

BACKGROUND

Tanker trucks are used throughout the world to transport a variety of liquids, including gasoline, chemicals, and water. When the truck is in motion, however, the liquid in the tank can create problems. For example, when it is necessary to stop, accelerate, or corner the truck, the inertia of the liquid within the tank creates a wave that transmits energy to various portions of the vehicle. This uncontrolled energy transfer can cause the vehicle to become unstable and affect the proper handling of the vehicle. This problem does not solely affect tanker trucks. Any form of transportation used to carry liquid, such as a rail car, a ship, or an airplane, can be subject to the same instability when in transit.

In addition to creating instability, sloshing of the liquid in the tank can cause stress to the inside of the tank. In particular, the uncontrolled liquid in the tank can wear down the walls and joints of the tank, thus reducing the tank's useful life. Furthermore, deterioration of the tank can result in dangerous leaks or spills.

useful life. Furthermore, deterioration of the tank can result in dangerous leaks or spills.

BRIEF DESCRIPTION OF THE DRAWINGS

FIG. 3b is an isolated cross-sectional view taken along line b—b of FIG. 3a.

FIG. 4b is a cross-sectional view of the fastener of FIG. 4a.

FIG. 4c is an isometric end view of the fastener of FIG. 4a.

FIG. 13b is a cross-sectional view taken along line b—b of FIG. 13a.

DETAILED DESCRIPTION

A. Overview

Various embodiments of the present invention provide liquid surge suppressors, including releasable fasteners having utility in this and other applications, and methods of manufacturing surge suppressors. Several embodiments in accordance with the invention are set forth in FIGS. 1–12b and the following text to provide a thorough understanding of particular embodiments of the invention. A person skilled in the art will understand, however, that the invention may have additional embodiments, or that the invention may be practiced without several of the details of the embodiments shown in FIGS. 1–12b.

Some embodiments of the invention provide surge suppressors for use in a liquid-filled tank. In one such embodiment, a surge suppressor includes three flexible longitudinal members, each having a first end portion, a second end portion, and a medial portion. The first end portions of the three longitudinal members are joined at a first flexible junction and the second end portions of the three longitudinal members are joined at a second flexible junction. The first flexible junction and the second flexible junction define two spaced-apart points along a longitudinal axis. The medial stabilizer is attached to the medial portions of the three longitudinal members and spaces the medial portions of the longitudinal members equiangularly about the longitudinal axis.

An additional aspect of the invention provides a method of assembling a surge suppressor from a plurality of flexible longitudinal members, each of which has a first end portion and a second end portion. A first fastener is slidably inserted through a first mounting orifice in each of the first end portions and the first fastener is rotated after insertion, releasably securing the first end portions of the longitudinal members. Each longitudinal member is slidably inserted through one of a plurality of slots in a medial stabilizer until a medial portion of each longitudinal members is received in one of the slots. A second fastener may be passed through a second mounting orifice in each of the second end portions and the second fastener may be rotated after insertion, releasably securing the second end portions of the longitudinal members.

Certain embodiments of the invention include a releasable fastener. The fastener includes a first lobe and second lobe, the lobes each having a transverse cross section that defines an n-sided polygon. A reduced-dimension body extends along the longitudinal axis between the first and second lobes. The body has a maximum transverse dimension less than the maximum transverse dimension of the first or second n-sided polygons. The second lobe has a base adjacent the body and an abutment spaced from the body. The orientation of the second polygon about a longitudinal axis is angularly displaced from the orientation of the first polygon about the longitudinal axis. Accordingly, the sides of the first and second polygons do not longitudinally align with one another.

For ease of understanding, the following discussion is subdivided into two areas of emphasis. The first section discusses aspects of surge suppressors in accordance with selected embodiments of the invention. The second section outlines methods in accordance with other aspects of the invention.

B. Medially Stabilized Liquid Surge Suppressors

Figure 1:
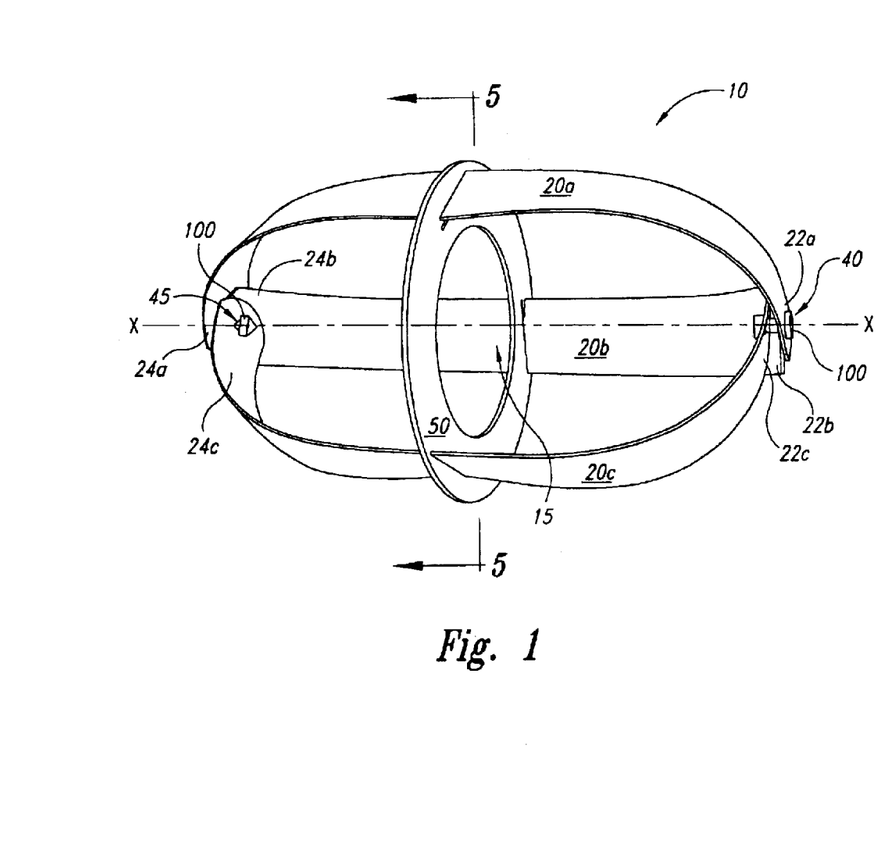
FIG. 1 is an isometric side view of a surge suppressor in accordance with one embodiment of the invention.

FIG. 1 is an isometric side view of a surge suppressor 10 in accordance with an embodiment of the invention. The surge suppressor 10 generally includes a plurality of flexible longitudinal members 20, a medial stabilizer 50, and two releasable fasteners 100. The longitudinal members 20 are relatively flexible and resilient, making the surge suppressor 10 resiliently compressible along a longitudinal axis X. The medial stabilizer 50, however, may be relatively stiff, with the longitudinal members being more flexible in a direction perpendicular to the longitudinal axis than is the medial stabilizer 50. This will provide dimensional stability in a transverse direction, enhancing the surge-dissipating capability of the surge suppressor 10.

In the illustrated embodiment, three longitudinal members 20a, 20b, and 20c are used in the surge suppressor 10. In other embodiments, however, the number of longitudinal members 20 may be increased. It is believed that having an odd number of longitudinal members 20 will increase eddying within an eddying zone 15 (discussed below) of the surge suppressor 10, thus better dissipating surges within a liquid-filled tank. The first end portions 22a–22c of the longitudinal members 20a–20c are joined at a first flexible junction 40 by a first releasable fastener 100. Likewise, the second end portions 24a–24c of the longitudinal members 20a–20c are joined at a second flexible junction 45 by a second releasable fastener 100. The first and second flexible junctions 40 and 45 are aligned along the longitudinal axis X. In the particular design shown in FIG. 1, the surge suppressor 10 is generally ellipsoidal and has a length along the longitudinal axis X that is greater than a transverse diameter, e.g., than the outer diameter of the medial stabilizer 50 or a maximum radial deviation of the longitudinal members 20 from the axis X.

The various components of the surge suppressor 10 are now described in more detail. The longitudinal members 20a–20c are discussed with respect to FIG. 2, the medial stabilizer 50 with respect to FIGS. 3a–3b, and the releasable fastener 100 with respect to FIGS. 4a–4c.

Figure 2:
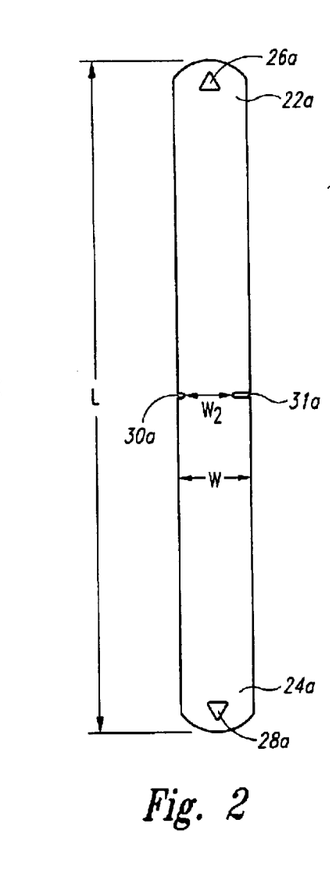
FIG. 2 is a top plan view of flexible longitudinal members that may be employed in the surge suppressor of FIG. 1.

FIG. 2 is a top plan view of a flexible longitudinal member 20 in accordance with an embodiment of the invention. Although the following discussion is directed only to longitudinal member 20a, longitudinal members 20b and 20c may be substantially the same and are not separately illustrated or discussed below. Longitudinal member 20a includes a first end portion 22a adjacent one end and a second end portion 24a adjacent an opposite end that is spaced longitudinally from the first end portion 22a. Longitudinal member 20a has a length L and a width W, with the length L being substantially larger than the width W. In the illustrated embodiment, the longitudinal member 20a is an elongated strip of flexible material. In one embodiment, the longitudinal member 20a can be made of high-density polyethylene (HDPE), though various other flexible materials can be used in other embodiments.

A first mounting orifice 26a passes through a thickness of the first end portion 22a of the longitudinal member 20a and a second mounting orifice 28a passes through a thickness of the second end 24a. Each of the first and second mounting orifices 26a and 28a may be define a polygonal opening, e.g., a triangular opening (as shown in FIG. 2), a rectangular opening, or a pentagonal opening. In one embodiment, each of the mounting orifices 26a and 28a comprises a generally equilateral n-sided polygon, with the number of sides an integral multiple of the number of longitudinal members (n) that are used in the surge suppressor 10. In some embodiments, the integral multiple is one, i.e., the number of sides of the polygonal mounting orifices 26a and 28a is the same as the number of longitudinal members 20. By way of example, the particular surge suppressor 10 illustrated in FIG. 1 has three longitudinal members 20, so the first mounting orifice 26a has three sides circumscribing an equilateral triangle. The second mounting orifice 28a may take the shape of an equilateral triangle having substantially the same dimensions as the first mounting orifice 26a. If the surge suppressor 10 instead had four longitudinal members 20, the mounting orifices 26a and 28a may comprise squares, whereas a surge suppressor 10 with five longitudinal members 20 may employ pentagonal mounting orifices 26a and 28a. In other embodiments, the openings may comprise n-lobed shapes, with one equiangularly-spaced lobe for each of the longitudinal members 20 in the surge suppressor. As discussed below, employing mounting orifices 26a and 28a will facilitate assembly of the surge suppressor with the fasteners 100.

Figure 3A:
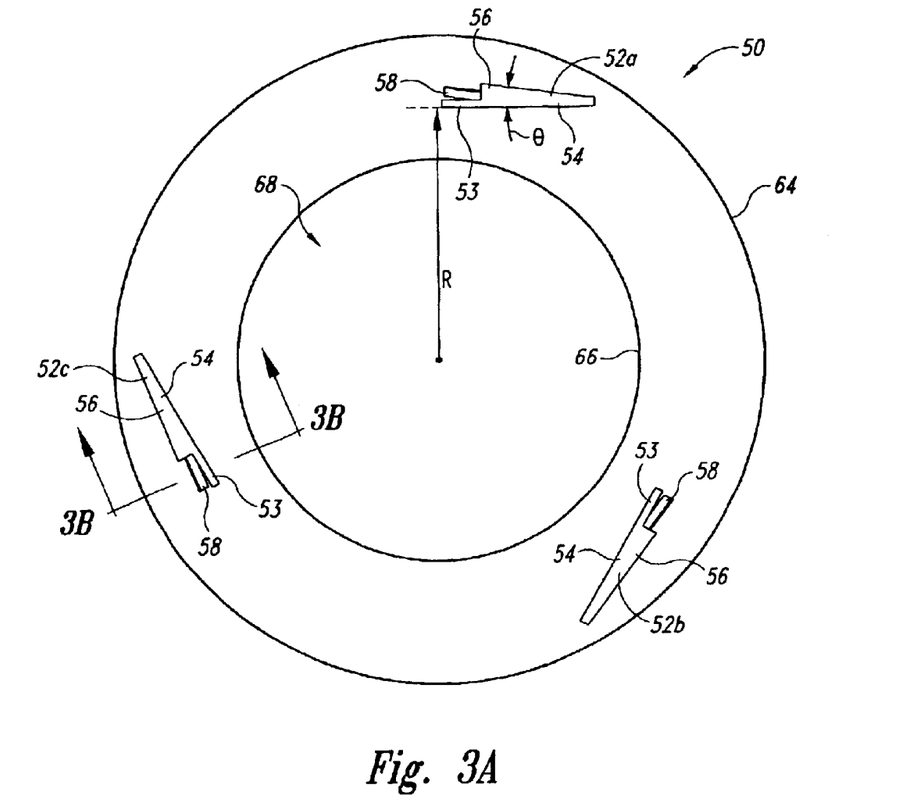
FIG. 3a is a top plan view of a medial stabilizer that may be employed in the surge suppressor of FIG. 1.

The longitudinal member 20a also includes at least one transversely-extending notch. The illustrated embodiment employs a pair of transversely-aligned notches 30a and 31a. The notches 30a and 31a are positioned in a medial portion 33 of the longitudinal member 20a located about half-way between the first and second end portions 22a and 24a. In the particular embodiment shown in FIG. 3, the notches include a larger notch 31a opposite a smaller notch 30a. In other embodiments, however, the notches 30a and 31a can be substantially the same size. The inner portions of notches 30a and 31a are separated by a width $W_2$. The notches 30a and 31a help secure the longitudinal member 20a to the medial stabilizer 50 (FIG. 1). One process for attaching the longitudinal member 202 to the medial stabilizer 50 is discussed below in connection with FIG. 5B.

FIG. 3a is a top plan view of the medial stabilizer 50. The medial stabilizer 50 has a planar body with an outer periphery 64 and an inner edge 66 that defines a central orifice 68. The outer periphery 64 in FIG. 4a is generally circular, but any other suitable shape (e.g., triangular) may be employed. In the illustrated embodiment, the medial stabilizer 50 includes a generally circular central orifice 68. In other embodiments, the central orifice 68 may be another shape, e.g., elliptical or rectangular. As described below, a circular central orifice 68 is expected to provide eddying zones along the longitudinal axis X that help dissipate liquid surges.

The medial stabilizer 50 further includes a plurality of slotted locks 52. The number of slotted locks 52 in the medial stabilizer 50 is equal to the number of longitudinal members 20a–20c (FIG. 1). In one embodiment, the slotted locks are spaced equiangularly about the center of the medial stabilizer 50. Hence, the specific embodiment shown in FIG. 3a has a first slotted lock 52a to receive the first longitudinal member 20a, a second slotted lock 52b to receive the second longitudinal member 20b, and a third slotted lock 52c to receive the third longitudinal member 20c. Each slotted lock 52 includes a base portion 54 and an angled portion 56. The base portion 54 should be wide enough for the entire width W of a longitudinal member 20 to slide therethrough during assembly. The angled portion 56 is narrower than the base portion 54 such that a length of the base portion 54 extends beyond an end of the angled portion 56 to define a notch 53. The angled portion 56 has a width that is less than the width W of the longitudinal member 20, but is equal to or greater than the width $W_2$ between the notches 30a and 30a on the longitudinal member 20a (FIG. 2).

Figure 3B:
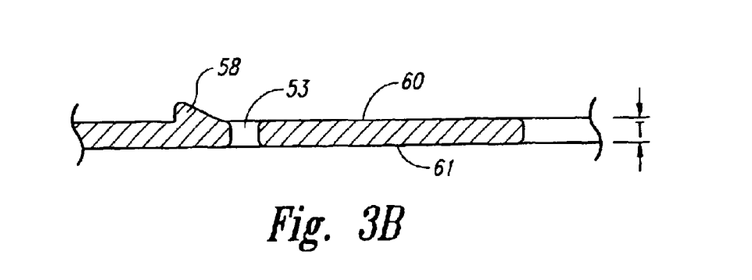

The base portion 54 of each slotted lock 52 is angularly offset with, respect to the radial axis R of the medial stabilizer 50. In one embodiment, the base portion 54 is perpendicular to the radial axis R, though other orientations may also be acceptable. The angled portion 56 of each slotted lock 52 is oblique with respect to the longitudinal axis (X in FIG. 1) of the surge suppressor 10. The angled portion 56 forms an angle θ with one end of the base portion 54, the other end of which is tangent to the radius of the central orifice 68. In one embodiment, this angle θ is about seven degrees. In other embodiments, however, this angle may vary, with angles of about 1–25° being expected to suffice, with angles of about 3–12° being preferred for select applications. FIG. 3b is an isolated cross-sectional view taken substantially along lines b—b of FIG. 3a, i.e., through the notch 53 of the slotted lock 52c. A retainer 58 is provided to hold the longitudinal members 20a–20c in place. As illustrated, the retainer may have an angular profile that tapers outwardly away from the slot, but defines a more abrupt shoulder on a side opposite the slot 53. The process of securing the longitudinal members 20a–20c to the medial stabilizer 50 is described below with respect to FIGS. 7–11.

The medial stabilizer 50 in the embodiment illustrated in FIG. 3b includes a first surface 60 and an opposite second surface 61. These surfaces 60 and 61 are spaced from one anther by a thickness T of the medial stabilizer 50. The appropriate thickness T for any particular application may depend on a variety of factors, e.g., the Young's modulus of the material employed, the forces expected to be encountered in use, the width of the annulus between the outer periphery 64 and the inner edge 66, commercially acceptable weight and displacement of the surge suppressors 10, etc. Taking these and other factors into consideration, the thickness T may advantageously be thick enough to provide the medial stabilizer with sufficient stiffness to resist radial compression. A thickness T of no more than about 25 mm (about 1 in.) is believed to suffice for most applications; thicknesses greater than 25 mm are expected to add unnecessary weight and volume and to unduly interfere with eddying in the eddying zone 15 (discussed below). Medial stabilizers 50 with a thickness T on the order of about 2.5–3.8 mm (about 0.097–0.150 in.) are expected to work well in a variety of applications. In the particular embodiment shown in FIG. 3b, this thickness T is about 3 mm (about ⅛ in.). The generally planar medial stabilizer 50 may lie in a plane transverse to (e.g., perpendicular to) the longitudinal axis (X in FIG. 1) of the surge suppressor 10. As explained below, orienting a relatively thin, planar stabilizer 50 transverse (e.g., perpendicular) to the longitudinal axis X of the surge suppressor 10 is expected to dissipate liquid surges more effectively by improving eddying within the interior of the surge suppressor 10.

Figure 4A:
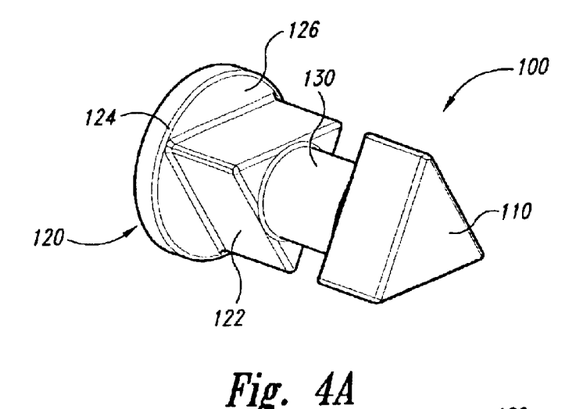
FIG. 4a is an isometric view of a fastener that may be employed in the surge suppressor of FIG. 1.
Figure 4B:
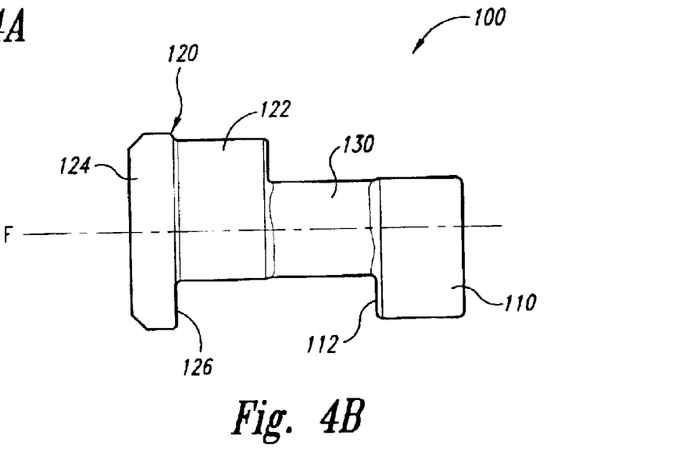
Figure 4C:
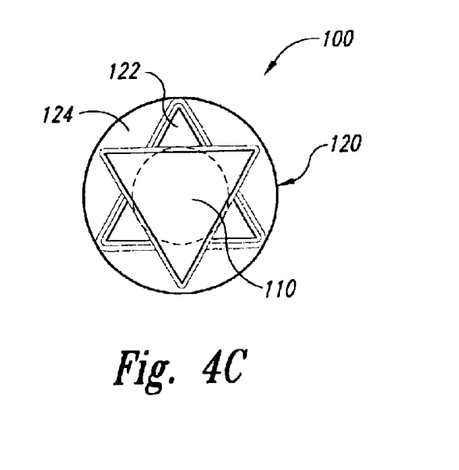

FIGS. 4a–c illustrate a fastener 100 in accordance with one embodiment of the invention. As explained below, this fastener 100 facilitates ready assembly of the surge suppressor 10, provides the surge suppressor 10 additional longitudinal flexibility, and may help reduce cross-contamination between liquid loads. This fastener 100 is expected to have utility in a number of applications other than surge suppressors.

The fastener 100 of FIGS. 4a–c includes a first lobe 110, a second lobe 120, and a reduced-dimension body 130 extending between the first and second lobes 110 and 120. The first lobe 110 and a body 122 of the second lobe 120 may each be sized and shaped to be received in one of the mounting orifices 26 and 28 of the longitudinal members 20. In the illustrated embodiment, the first lobe 110 has a triangular transverse cross-section having three longitudinally-extending sides of approximately equal length. The body 122 of the second lobe 120 is also generally an equilateral triangular in transverse cross-section. In other embodiments, however, the first lobe 110 and the base 122 of the second lobe 120 can include a transverse cross-section that defines any n-sided polygon. The number of sides (n) should correlate with the number of longitudinal members 20a–20c, as described above with respect FIG. 2. The second lobe 120 also includes an abutment 124 having a that extends laterally beyond a periphery of the base 122 to limit axial movement of the longitudinal members 20, as discussed below. In the illustrated embodiment, the abutment 124 is typified as an annular cap. In other embodiments, however, any of a variety of shapes may be used for the abutment 124, e.g., rectangular or arcuate caps.

The fastener 100 includes a reduced-dimension body 130 extending along a longitudinal axis F between the first lobe 110 and the second lobe 120. The longitudinal axis F is aligned with the longitudinal axis X through the surge suppressor 10 (FIG. 1). The reduced-dimension body 130 has a maximum transverse dimension less than a maximum transverse dimension of the first lobe 110 and the second lobe 120. The distance between a confronting face 126 of the abutment 124 and a locking face 112 of the first base 110 is desirably at least as long as the combined thicknesses of the longitudinal members 20a–c. In one embodiment, the body 130 has a length that is greater than the combined thickness of two of the longitudinal members 20. As best seen in FIG. 4c, the longitudinally-extending sides of the first lobe 110 are not aligned with the longitudinally-extending sides of the base 122 of the second lobe 120. Rather, the longitudinally-extending sides of the first lobe 110 are angularly displaced from longitudinally-extending sides of the second lobe 120. In the particular illustrated design, the triangular first lobe 110 is offset about 120° from the base 122 of the second lobe 120.

Figure 5:
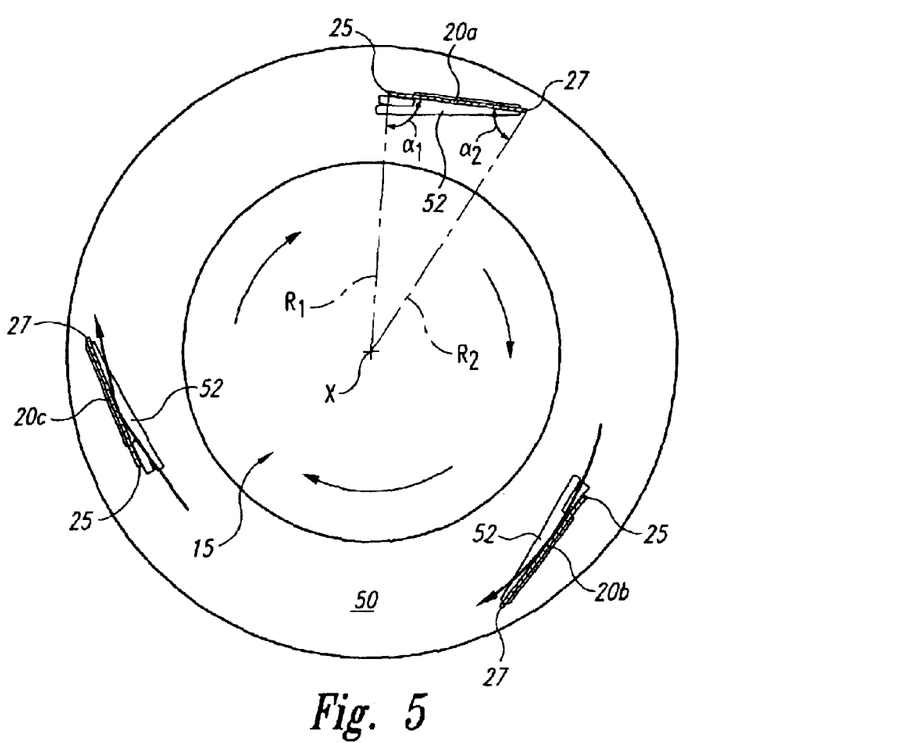
FIG. 5 is a cross-sectional view taken along line 5—5 of FIG. 1.

FIG. 5 is a cross-sectional view of the surge suppressor 10, taken substantially along lines 5 of FIG. 1, that schematically illustrates aspects of fluid flow in the surge suppressor 10. Each of the longitudinal members 20 is received in the angled portion (56 FIG. 3) of one of the slotted locks 52. As noted above, this angled portion 56 is oriented obliquely to the longitudinal axis X of the surge suppressor 10. Accordingly, when the longitudinal members 20 are held in the angled portions, they will be oriented obliquely with respect to the longitudinal axis X. In some embodiments, a midline between the opposed longitudinal side edges 25 and 27 of each of the longitudinal members 20 is tangent to a circle that lies in a plane perpendicular to the longitudinal axis X and that is centered about the longitudinal axis X. In one particularly utile embodiment, however, this midline of at least one of the longitudinal members 20 does not define a tangent point to such a circle. As illustrated in FIG. 5, this would dictate that a first radius $R_1$ from the longitudinal axis X to the first edge 25 of the longitudinal member 20a has a length that differs from the length of a second radius $R_2$ from the longitudinal axis X to the second edge 27 of the longitudinal member 20a. This also dictates that (1) the first radius $R_1$ forms an angle $\alpha_1$ with the longitudinal member 20a that differs from the angle $\alpha_2$ formed between the longitudinal member 20a and the second radius $R_2$, and (2) a triangle including the first radius $R_1$, the second radius $R_2$, and the longitudinal member 20a is a non-isosceles triangle.

As suggested by the arrows in FIG. 5, such a non-tangential obliquity of the longitudinal members 20a can deflect the transverse flow of fluid to establish an eddying zone 15 in an interior of the surge suppressor 10. In particular, when fluid flows transversely against the surge suppressor 10, the longitudinal members 20 act as vanes, redirecting fluid flow toward a generally circular path, as illustrated in FIG. 5. This will induce eddying of the fluid within an eddying zone 15 that extends lengthwise along a length of the longitudinal axis X (FIG. 1) of the surge suppressor 10. The medial stabilizer 50 may promote eddying within this eddying zone 15 in a number of ways. For example, the circular orifice 68 in the medial stabilizer 50 will not interfere with eddying about the longitudinal axis X of the surge suppressor 10; an orifice 68 with a more angular shape, e.g., a triangle, may disrupt this eddying flow. Employing a planar medial stabilizer 50 will also reduce the longitudinal profile of the medial stabilizer 50. If the medial stabilizer 50 were a longitudinally-extending radial strap instead of a transversely-oriented planar shape, as shown, the strap would induce turbulence in fluid flowing into the interior of the surge suppressor, which could hamper the eddying effect of the longitudinal member 20.

It should also be noted that the first and second end portions 22 and 24 will be constrained by the fasteners 100 to approach a perpendicular relationship to the longitudinal axis X of the surge suppressor, but the medial portions 33 of the longitudinal members 20 are constrained by the angled portions (56 in FIG. 3) of the slotted locks 52. As a result, each of the longitudinal members 20 is twisted along its length. This will further enhance eddying within the eddying zone 15 of the surge suppressor 10 by promoting eddying even in fluid flowing along a generally longitudinal path.

Figure 6:
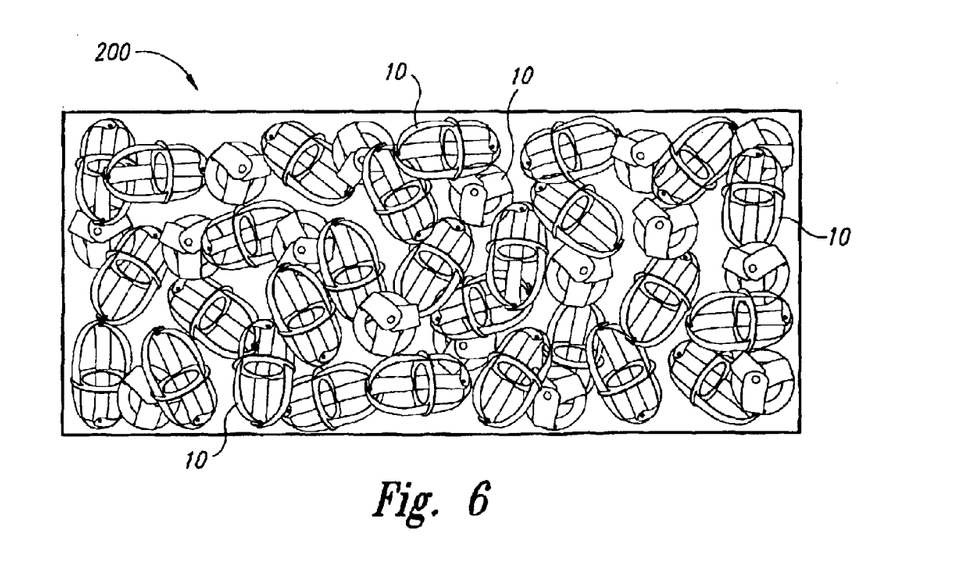
FIG. 6 is a schematic view of a tank with a plurality of surge suppressors in accordance with another embodiment of the invention.

In one implementation of the invention illustrated in FIG. 6, a plurality of surge suppressors 10 are placed in a liquid-receiving tank 200 to dampen inertial movement of a liquid load in the tank 200, enhancing driver control of a conveying vehicle. The eddying zone (15 in FIG. 1) of each of surge suppressors will dissipate energy in liquid in the tank. For example, if the vehicle conveying the tank 200 must come to a relatively abrupt stop, inertia in the liquid load will tend to cause the liquid to surge forward. The inertial energy of the liquid can be spent, in part, by the eddies in the eddying zones 15 of the surge suppressors 10. This will reduce the force of the liquid against the interior of the tank, helping stabilize the tank.

The optimal number of surge suppressors 10 for an individual tank is dependent, at least in part, on the tank volume. Even a limited number of surge suppressors 10 can help control liquid movement. Performance can be enhanced by adding a sufficient number of surge suppressors 10 to fill the tank, with all of the surge suppressors 10 in the tank in contact with each other as well as the interior surface of the tank, as illustrated in FIG. 6. The surge suppressors 10 may be allowed to assume a relatively random orientation in the tank 200. In this manner, a limited number of the surge suppressors 10 are likely to be oriented with their longitudinal axes coinciding with the direction of fluid flow, in which position the surge suppressors are likely to be less effective in dampening fluid flow through the surge suppressor 10.

C. Methods of Manufacturing Liquid Surge Suppressors

Each surge suppressor 10 may be provided pre-assembled as illustrated in FIG. 1, or may be provided in a kit ready for assembly. A kit to make the surge suppressor 10 of FIG. 1, for example, may comprise one medial stabilizer 50, three longitudinal members 20 (each of which may be substantially identical), and two fasteners 100. Assembling the surge suppressor 10 is fairly easily and swift, as understood from the succession of illustrations in FIGS. 7–12. In some embodiments, disassembling a surge suppressor 10 is also easily accomplished by reversing the steps of assembly. The following discussion and FIGS. 7–12 focus on assembly of the particular surge suppressor 10 shown in FIGS. 1–5. It should be understood, though, that the methods outlined below may have utility in assembling surge suppressors that differ from the specific design of FIG. 1.

Figure 7A:
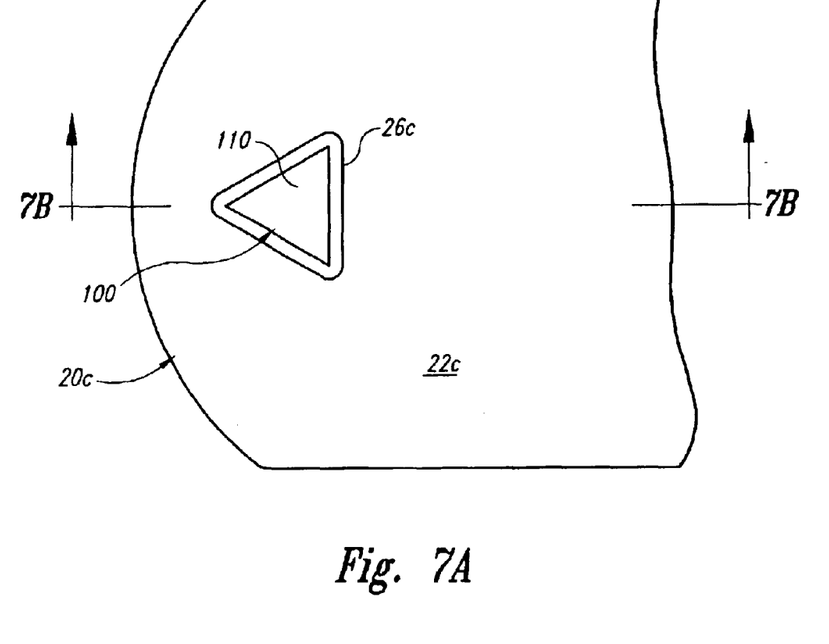
FIGS. 7–12 are a succession of views illustrating stages in the assembly of the surge suppressor of FIG. 1.
Figure 7B:
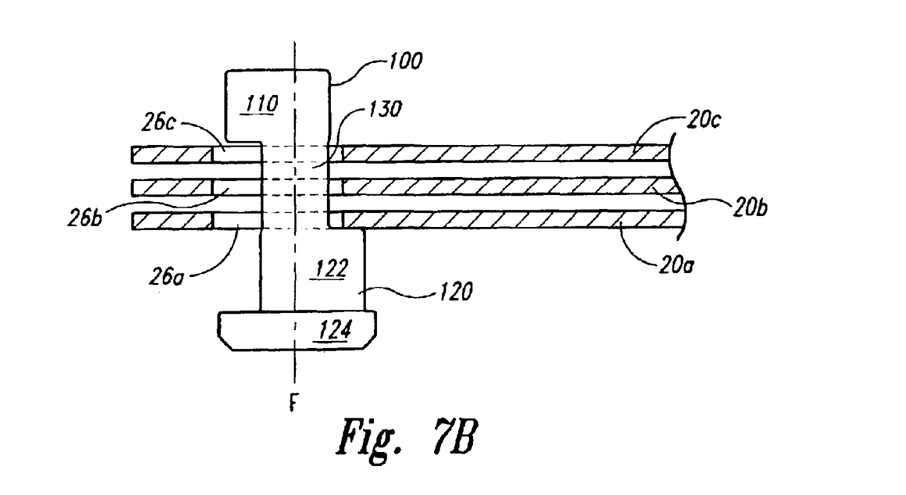
Figure 8:
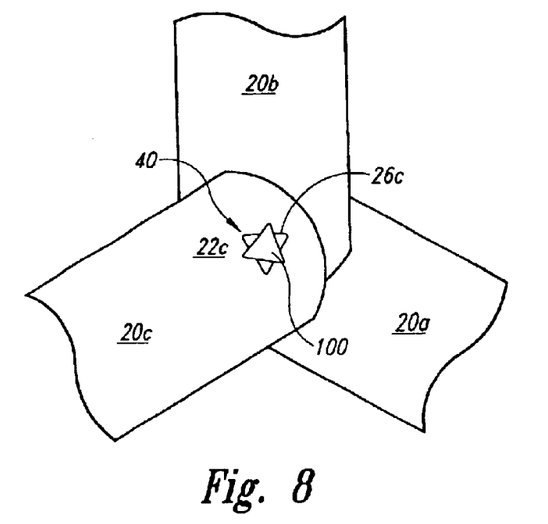

Beginning with FIGS. 7a and 7b, the three longitudinal strips 20a–20c may be arranged such that the first mounting orifices 26a–26c are aligned. As best seen in FIG. 7b, the first lobe 110 of the first fastener 100 is then slidably inserted through the aligned first mounting orifices 26a. After the first lobe 110 of the fastener 100 passes through the innermost mounting orifice 26c, the fastener 100 is slightly rotated so that the three longitudinal sides of the first lobe 110 of the fastener 100 are no longer aligned with the sides of the first mounting orifice 26c of the longitudinal member 20c, as shown in FIG. 8. Accordingly, the longitudinal member 20c is held in place between the first and second lobes 110 and 120 of the fastener 100. The other two longitudinal members 20b and 20c may be turned about the body 130 of the fastener 100, also as shown in FIG. 8, to orient them for subsequent assembly steps.

Figure 9:
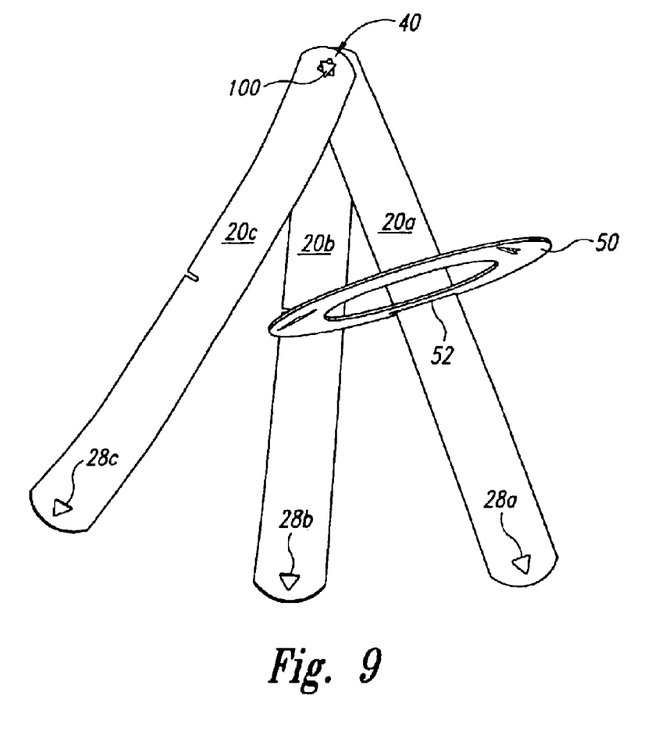

FIG. 9 illustrates the next step in assembling the surge suppressor 10. The first longitudinal member 20a is slidably inserted through a slotted lock 52a in the medial stabilizer 50 until the medial portion 33 of the longitudinal member 20a is received within the slotted lock 52. The longitudinal member 20a should be oriented such that the smaller notch 30a is aligned with the smaller tapered end of the slotted lock 52 where the base portion 54 and angled portion 56 meet. The larger notch 31a should be aligned with the notch 53 of the slotted lock 52. The longitudinal member 20a is then rotated slightly outward away from the center of the medial stabilizer 50. The larger notch 31a should flex to allow it to pass over the retainer 58 of the slotted lock 52. Once the larger notch 31a passes over the retainer 58, the longitudinal member 20a will snap into place behind the back surface of the retainer, helping fix the angular orientation of the medial portion 33 of the longitudinal member 20a with respect to the medial stabilizer 50. This process is repeated for the other two longitudinal members 20b and 20c, as illustrated in FIGS. 10 and 11, respectively.

Figures 10, 11:
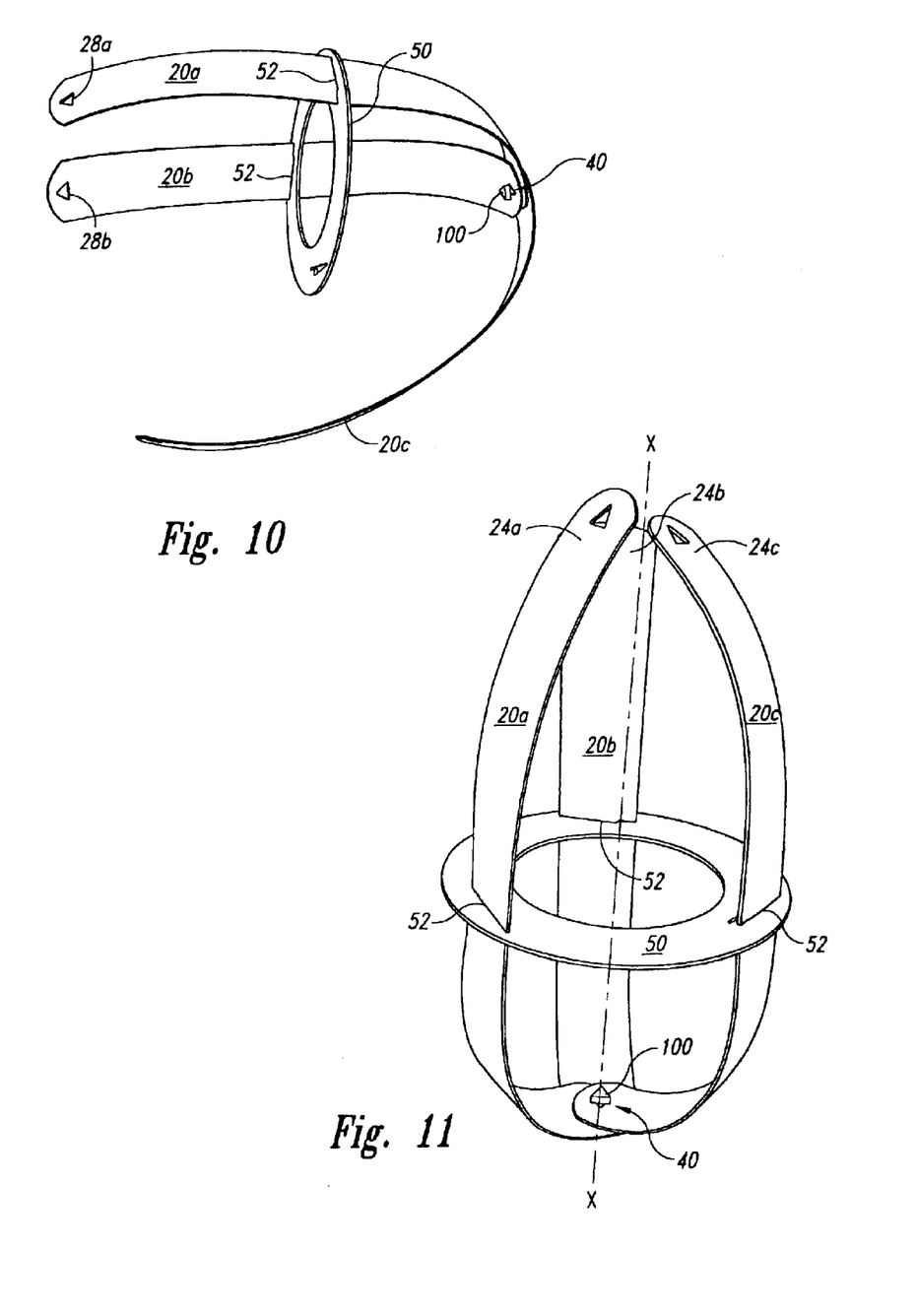
Figure 12:
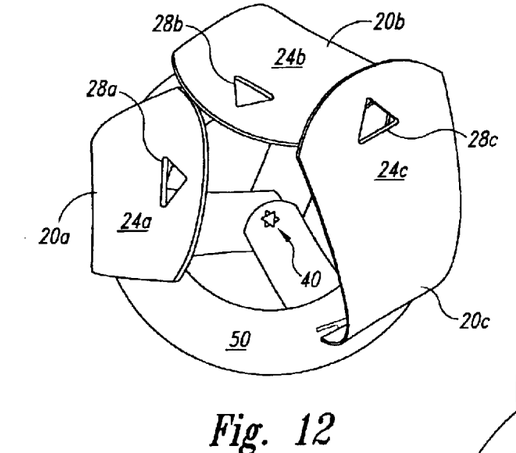

FIG. 12 is an end view of the partially-assembled surge suppressor of FIG. 11, showing the relative orientations of the second ends 24a–24c of the longitudinal members 20a–20c. The second ends 24a–24c may be brought together such that the second mounting orifices 28a–28c are aligned. The first lobe 110 of another fastener 100 is passed through the aligned second mounting orifices 28a–28c. After the first lobe 110 of the fastener 100 passes through each of the second mounting orifices 28a–28c, the fastener 100 is rotated (e.g., about 120°) such that the first lobe 110 no longer is aligned with the second mounting orifices 28a–28c.

Figure 13A:
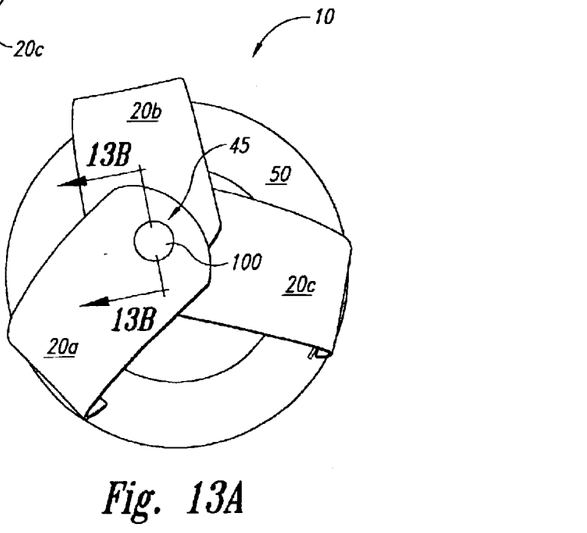
FIG. 13a is an isometric end view of the surge suppressor of FIG. 1.
Figure 13B:
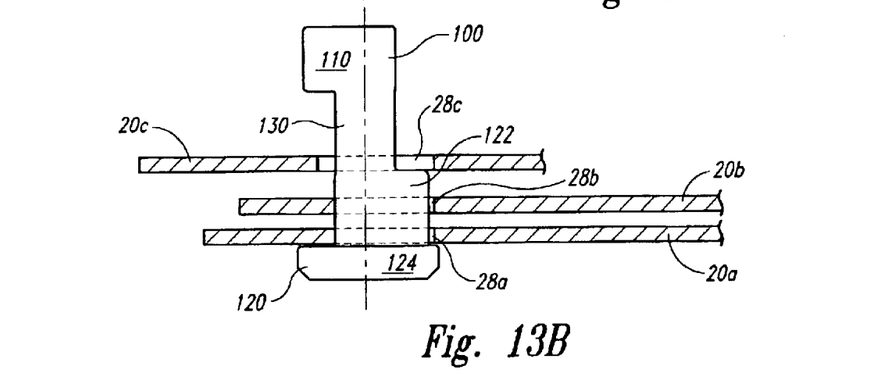

FIGS. 13a and 13b illustrate the assembled second flexible junction 45. The fastener 100 secures the second ends 24a–24c of the longitudinal members 20a–20c. As illustrated in FIG. 13b, the longitudinal members 20 are free to move axially along the reduced dimension body 130 between the first lobe 110 and the second lobe 120 of the fastener 100 along the longitudinal axis X. Axial flexibility along the longitudinal axis X enhances flexibility in the longitudinal direction, allowing the surge suppressor 10 to fit in various size tanks. The axial flexibility also allows liquid flow between the longitudinal members 20a–20c at the flexible junction 45, providing for easier cleaning of the flexible junction 45. Easier cleaning can reduce cross-contamination between liquid loads if the surge suppressors 10 are used for different materials. This can also reduce the likelihood that food products (e.g., milk) or other liquids subject to spoilage will become trapped between the parts of the surge suppressor 10, potentially contaminating subsequent liquid loads.

By virtue of their resilience, the ends portions 22 and 24 of the longitudinal members 20 will be biased away from one another. This causes the longitudinal members 20a–20c to be resiliently urged toward the second lobe 120 of the fastener 100. This will tend to cause the second mounting orifice 28a of at least the outermost longitudinal member 20a to be received on the base 122 of the second lobe 120. Because the abutment 124 of the second lobe 120 extends peripherally outwardly of the base 122, the abutment 124 restricts further axial movement of the longitudinal members 20a–20c along the longitudinal axis X. Additionally, receiving at least one of the second orifices 28 on the base 122 of the second lobe 120 will restrict angular rotation of the fastener 100 with respect to the medial stabilizer 50. The medial stabilizer 50 fixes the relative orientation of the longitudinal members 20 with respect to one another, keeping the second orifices 28 of the longitudinal members 20 generally aligned with one another. By virtue of the angular offset between the first and second lobes 110 and 120 of the fastener, this will significantly reduce the likelihood that the second ends 24 of the longitudinal members will slide off the fastener.

One advantage of the illustrated embodiment is the ease of assembly. As demonstrated by the foregoing discussion, there are no tools required for the assembly of the surge suppressor 10. A surge suppressor 10 can be assembled in just a matter of minutes. Furthermore, the surge suppressor 10 can also be quickly disassembled for cleaning or storage.

Another advantage of the surge suppressor 10 is that the medial stabilizer 50 provides rigidity to the surge suppressor 10 without significantly impeding cross flow within the tank. The substantially flat medial stabilizer 50, with minimal thickness in the longitudinal direction, enhances eddying in the eddying zone 15, helping dampen undesirable flow within the tank. Furthermore, the use of a medial stabilizer 50 allows axial movement of the longitudinal members 20a–20c, while providing dimensional stability in the center of the surge suppressor 10. The added flexibility near the ends of the surge suppressor 10 allows a number of surge suppressors 10 in a tank (FIG. 6) to press against one another, but the medial stabilizer will maintain at least a medial portion of each of the surge suppressors 10 in a configuration adapted to induce eddying within the eddying zone 15.

The above-detailed descriptions of embodiments of the invention are not intended to be exhaustive or to limit the invention to the precise form disclosed above. Specific embodiments of, and examples for, the invention are described above for illustrative purposes, but various equivalent modifications are possible within the scope of the invention, as those skilled in the relevant art will recognize. For example, whereas steps are presented in a given order, alternative embodiments may perform steps in a different order. The various embodiments described herein can be combined to provide further embodiments.

Unless the context clearly requires otherwise, throughout the description and the claims, the words "comprise," "comprising," and the like are to be construed in an inclusive sense as opposed to an exclusive or exhaustive sense, i.e., in a sense of "including, but not limited to." Use of the word "or" in the claims in reference to a list of items is intended to cover a) any of the items in the list, b) all of the items in the list, and c) any combination of the items in the list.

In general, the terms used in the following claims should not be construed to limit the invention to the specific embodiments disclosed in the specification, unless the above-detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A surge suppressor comprising:
   a plurality of flexible longitudinal members, each of which is joined to the other longitudinal members at a first junction and at a second junction spaced from the first junction along a central axis; and
   a generally planar medial disk lying in a transverse plane substantially perpendicular to the central axis and having a generally circular central orifice, the medial disk being joined to an intermediate portion of each of the longitudinal members intermediate the first and second junctions and defining a fixed relationship between the longitudinal members, and
   wherein the flexible longitudinal members are adaptable for eddying of fluid along the central axis; wherein the intermediate portion of each of the longitudinal members passes through a thickness of the medial disk;
   and wherein the first junction comprises a first fastener that secures first free ends of the flexible longitudinal members, and the second junction comprises a second fastener that secures second free ends of the flexible longitudinal members.

2. The surge suppressor of claim 1 wherein the medial disk is generally annular in shape and has an outer periphery spaced radially outwardly from the central orifice to define an annular width between the central orifice and the outer periphery.

3. The surge suppressor of claim 2 wherein the medial disk has a thickness measured along the central axis, the width being greater than the thickness.

4. The surge suppressor of claim 1 wherein the transverse plane is positioned midway between the first and second junctions along the central axis.

5. The surge suppressor of claim 1 wherein the medial disk includes a plurality of slots, each of the slots receiving the intermediate portion of one of the longitudinal members.

6. The surge suppressor of claim 1 wherein each of the longitudinal members is more flexible in a direction perpendicular to the longitudinal axis than is the medial stabilizer.

7. The surge suppressor of claim 1 wherein the first and second junctions allow opposite end portions of the flexible longitudinal members to move along the longitudinal axis with respect to one another.

* * * * *